in a minimum of water with the addition of 15 ml. ethyl alcohol.

To dissolve the aldehydes the mixture is heated. It is first kept at 75° C. for 5 minutes and then at room temperature for 1 hour. Working up is carried out analogously to Example IV and after recrystallization from methyl alcohol, there are obtained 1.9 g. (51%) 5-p-[bis-(β-chloroethyl) - amino] - benzylidene-2-methyl-cyclopentanone-3-carboxylic acid; M.P. 168–169° C.

EXAMPLE VI 5-p-[bis-(β-chloroethyl)-amino]-benzylidene-2-ethyl-cyclopentanone-3-carboxylic acid The procedure described in Example V is followed with the use of 1.56 g. (0.01 mole) 2-ethyl-cyclopentanone-3-carboxylic acid, 2.46 g. (0.01 mole) p-[bis-(β-chloroethyl)-amino]-benzaldehyde and 1.8 g. potassium hydroxide. After recrystallization from methyl alcohol, there are obtained 2.5 g. (65.1%) 5-p-[bis-(β-chloroethyl)-amino] - benzylidene-2-ethylcyclopentanone-3-carboxylic acid; M.P. 167–169° C.

EXAMPLE VII 5-p-[bis-(β-chloroethyl)-amino]-benzylidene-2-ethyl-cyclopentanone-4-carboxylic acid The procedure described in Example V is followed with the use of 2.0 g. (0.12 mole) 5-ethyl-cyclopentanone-3-carboxylic acid, 2.45 g. (0.01 mole) p-[bis-(β-chloroethyl)-amino]-benzaldehyde and 2.3 g. potassium hydroxide.

Deviating from the method described in Example V, the mixture is kept at 60° C. for 5 minutes and then poured into water. The unreacted aldehyde is separated by filtering off with suction and the solution is acidified with glacial acetic acid. After recrystallization from methyl alcohol, there are obtained 1.8 g. (46.6%, referred to the aldehyde) 5-p-[bis-(β-chloroethyl)-amino]-benzylidene-2 ethyl-cyclopentanone - 4 - carboxylic acid; M.P. 168–169° C.

What is claimed is:
1. Compounds of the formula:

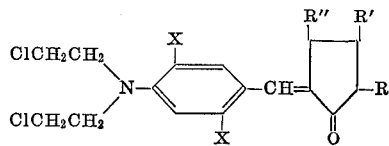

wherein

X is hydrogen or alkoxy of 1 to 2 carbon atoms,
R is alkyl of 1 to 4 carbon atoms or —CH$_2$COOH, and
R' and R'' are hydrogen, or carboxyl.

2. The compound according to claim 1 which is 5-p-[bis-(β-chloroethyl)-amino]-benzylidene-2-methyl - cyclopentanone.

3. The compound according to claim 1 which is 5-p-[bis-(β-chloroethyl)-amino]-benzylidene - 2 - ethyl-cyclopentanone.

4. The compound according to claim 1 which is 5-[4'-bis-(β-chloroethyl) - amino - 2',5' - dimethoxy]-benzylidene-2-ethyl-cyclopentanone.

5. The compound according to claim 1 which is 5-p-[bis-(β-chloroethyl) - amino] - benzylidene - cyclopentanone-2-acetic acid.

6. The compound according to claim 1 which is 5-p-[bis-(β-chloroethyl)-amino] - benzylidene - 2 - methyl-cyclopentanone-3-carboxylic acid.

7. The compound according to claim 1 which is 5-p-[bis-(β-chloroethyl) - amino] - benzylidine - 2 - ethyl-cyclopentanone-3-carboxylic acid.

8. The compound according to claim 1 which is 5-p-[bis-(β-chloroethyl) - amino] - benzylidene-2-ethyl-cyclopentanone-4-carboxylic acid.

References Cited

Finar, I. L., Organic Chemistry, vol. I, (1963), pub. by R. Clay and Co., Ltd., London, p. 650 relied on.

LORRAINE A. WEINBERGER, Primary Examiner
L. A. THAXTON, Assistant Examiner

U.S. Cl. X.R.

260—514, 519, 574, 577, 586; 424—319, 330

United States Patent Office 3,542,860
Patented Nov. 24, 1970

---

3,542,860
CYCLOPENTANONE DERIVATIVES
Raffaele Giuliano, Via S. Erasmo 31, Rome, Italy; Aldo Ermili, Via Minerbio 21, Rome-Vitinia, Italy; Marino Artico, Via Edgardo Negri 64/3–00128, Rome, Italy; Robert Bierling, % Farbenfabriken Bayer AG., Wuppertal-Elberfeld, Germany; and Dieter Steinhoff, Bochom, Germany, % Farbenfabriken Bayer AG., Wuppertal-Elberfeld, Germany
No Drawing. Filed Dec. 4, 1967, Ser. No. 687,497
Claims priority, application Germany, Dec. 2, 1966,
F 50,825
Int. Cl. C07c 101/44
U.S. Cl. 260—518       8 Claims

ABSTRACT OF THE DISCLOSURE

Cyclopentanone derivatives have been found to be effective in a selective manner against tumor cells. In experimental tests on rats and mice cyclopentanone derivatives of the formula:

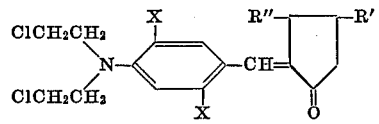

wherein X is hydrogen or alkoxy of 1 to 2 carbon atoms, R is alkyl of 1 to 4 carbon atoms or —CH$_2$COOH, and R' and R" are hydrogen, alkyl or carboxyl, were shown to be effective against intramuscularly transplanted Jensen sarcoma in rats and Ehrlich carcinoma in mice. The cyclopentanone derivatives can be produced by reacting a p-[bis-(β-chloroethyl)-amino]-benzaldehyde of the formula:

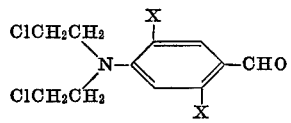

in an alkaline medium with a cyclopentanone of the formula:

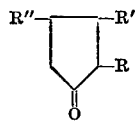

wherein X, R, R' and R" are as above defined.

---

The present invention is concerned with cyclopentanone derivatives. It is known that methyl-bis-(2-chloroethyl)-amine and to a greater extent 4-[p-bis-(β-chloroethyl)-amino-phenyl]-butyric acid and p-[bis-(2-chloroethyl)-amino]-L-phenyl-aniline have a highly selective effect on tumor cells. Cyclopentanone derivatives of the formula:

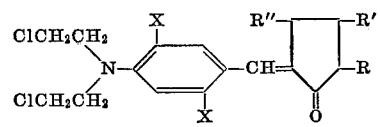

wherein

X is hydrogen or alkoxy of 1 to 2 carbon atoms,
R is alkyl of 1 to 4 carbon atoms or —CH$_2$COOH, and
R' and R" are hydrogen, alkyl or carboxyl, have been found to be effective in experimental tests wherein tumor cells were transplanted intramuscularly in rats and mice. As the data in Table I shows, the compounds of the present invention are effective at the dosages shown administered intraperitoneally against Jensen sarcoma in rats and Ehrlich carcinoma in mice, while not showing nearly as great an effect against Walker carcinoma in rats. These results are highly surprising because Walker carcinoma is a type of tumor which responds most readily to a number of experimentally tried treatments and it would normally be expected that any potential tumor inhibiting compound would be extremely effective against Walker carcinoma, whereas the present compounds show a greatly enhanced effect against both Jensen sarcoma and Ehrlich carcinoma as compared to Walker carcinoma.

The cyclopentanone derivatives of the present invention can be produced by reacting a p-[bis-(β-chloroethyl)-amino]-benzaldehyde of the formula:

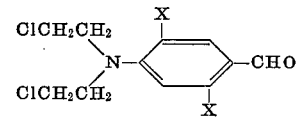

in alkaline medium with a cyclopentanone of the formula:

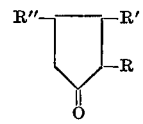

wherein X, R, R' and R" are defined above. The cyclopentanone derivatives of the present invention are crystalline and insoluble in water and dilute acids. Some are soluble in dilute bases and Table I show three compounds of the present invention which are soluble in dilute bases.

It is generally preferred to carry out the reaction in an aqueous-alkaline medium. Mixtures of water with lower aliphatic alcohols such as methanol, ethanol, propanol, isopropanol, etc. may be facily used. Good yields which normally amount to more than 85% of the theoretical can be obtained by carrying out the reaction with the application of heat. The general temperature range should be 40° C. to 80° C. and preferably in the range of 60° C. to 75° C.

Depending upon the starting materials used, the heating can be applied for a few minutes up to about 2 hours. For some compounds the optimum reaction times are about 5 minutes, while others require longer periods of time up to about an hour. However, the differences in length of time of the application of heat can be readily determined by one of ordinary skill in the art.

Table I below shows the effects of seven compounds according to the present invention in varying dosage ranges against tumors transplanted intramuscularly in rats and mice. Three types of tumors were employed, namely Jensen sarcoma, Walker carcinoma and Ehrlich carcinoma. The dosage is listed in the table in milligrams/kilograms administered daily on five successive days i.p.

PO-1050
(5/69)

UNITED STATES PATENT OFFICE
CERTIFICATE OF CORRECTION

Patent No. 3,542,860                    Dated November 24, 1970

Inventor(s)    Raffaele Giuliano et al.

It is certified that error appears in the above-identified patent and that said Letters Patent are hereby corrected as shown below:

After the names of the inventors and their addresses, kindly insert the following: --assignors to Farbenfabriken Bayer A.G., Leverkusen, Germany. --.

Signed and sealed this 6th day of April 1971.

(SEAL)
Attest:

EDWARD M.FLETCHER,JR.                WILLIAM E. SCHUYLER, J.
Attesting Officer                    Commissioner of Patent